May 9, 1950     A. B. DE SALARDI     2,506,780
STORAGE BATTERY CHARGER
Filed Jan. 31, 1946
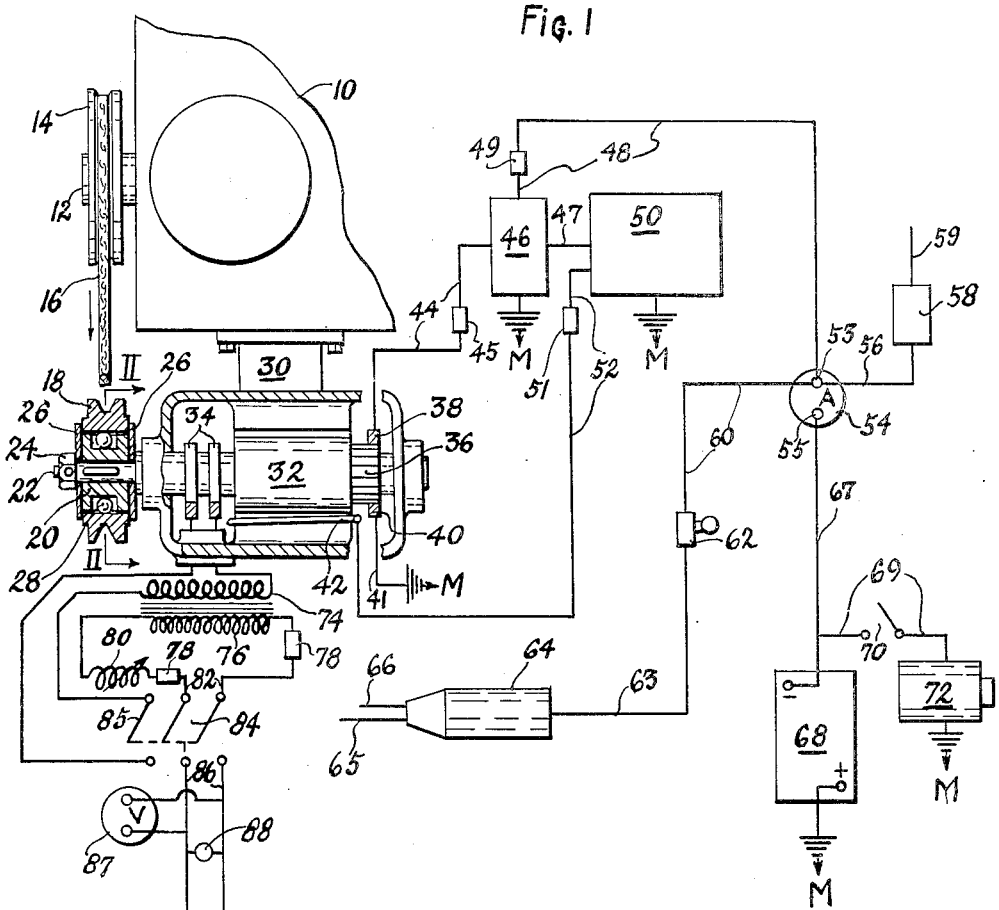
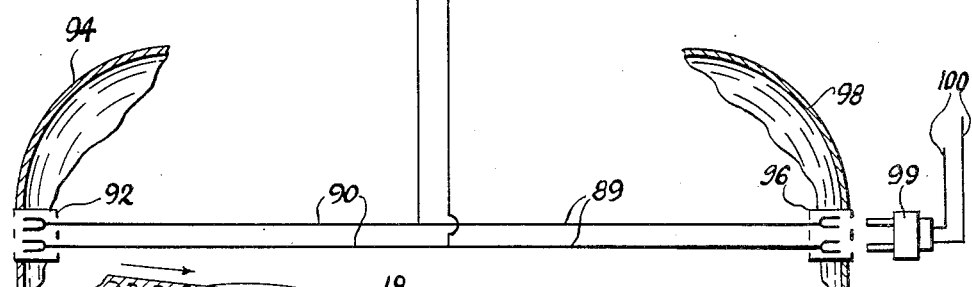
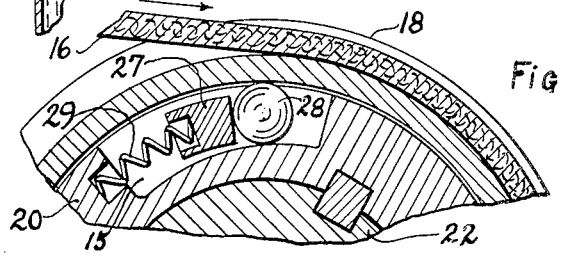
INVENTOR:
Albert Bernhard de Salardi Patented May 9, 1950

2,506,780

UNITED STATES PATENT OFFICE 2,506,780

STORAGE BATTERY CHARGER

Albert Bernhard De Salardi, Wilkinsburg, Pa.

Application January 31, 1946, Serial No. 644,516

5 Claims. (Cl. 290—50)

My invention pertains to electric storage battery chargers and particularly to those used in vehicles provided with an internal combustion engine such as automobiles, trucks, etc. and to the methods of charging such batteries.

Heretofore automotive vehicles, that had storage battery-connected ignition and lighting systems, were provided with a direct current electric generator which was driven by the engine, the generated direct current charging the battery. If the battery became run down for any reason it had to be exchanged or recharged by an outside source of direct current, which is not generally available, involving some assembly and disassembly, interruption of operation and other inconveniences; besides the life of the battery was considerably shortened by periodic nonuse, possible freezing in cold weather, insufficient charging, etc.

My invention obviates these and other drawbacks by providing, in combination with the direct current generator, means for utilizing an outside source-supplied alternating electric current (of about 100 to 125 volts tension which is generally available) for producing direct electric current of suitable tension for charging the battery and keeping it properly charged, selectively when the engine of the vehicle is running or being started or not in operation. Thus freezing of the battery in cold weather or its discharge by nonuse or due to excess load at starting the engine are avoided and its life prolonged by being kept fully charged, inasmuch as it can be assumed that alternating current of the usual 100–125 volts tension is available at places where the vehicle is stopped for a protracted period of time (home, garage, parking place, etc.).

Hence one object of my invention is to provide in a vehicle, having an internal combustion engine and a storage battery, a battery charger comprising electromagnetic means, utilizing part of the mechanical energy developed by the engine, and also other means using alternating current from a source outside of the vehicle for producing direct electric current suitable to charge the battery.

Another object is to provide a storage battery charger which is equipped with means for the transformation of mechanical energy as well as electrical energy, manifested in an alternating electric current, into direct electric currents, has regulating means, both in the direct current and in the alternating current circuits, to keep them within desirable limits of tension and intensity and to apply them to the battery for charging it properly.

A further object is to provide in an automotive vehicle a storage battery charger that utilizes part of the mechanical energy developed by the engine as well as an alternating current, the source of which is located outside of the vehicle, to produce direct current for charging the battery and has connecting means for the alternating current comprising sockets fixed to but operable from the outside front and rear of the vehicle by pushing or pulling the plug of the outside line of the alternating current in substantially parallel direction to that of the travel of the vehicle.

Another object is to provide a storage battery charger which will selectively charge the battery with any or both direct currents derived by transformation of mechanical energy and from an alternating current from an outside source, respectively.

Another object is to provide a storage battery charger in an automotive vehicle which, when receiving alternating current from an outside source, will charge the battery with a suitable direct current, keep it charged and protect it from overcharge and freezing and relieves it from undue overload by supplying part of the current necessary to start the engine.

These and other objects will be understood and the achieved advantages become evident from the following description and accompanying drawing in which:

Fig. 1 is the diagram of one preferred embodiment of my invention in which a rotary converter is employed to produce direct current for charging the battery out of alternating current from an outside source; the devices combined are shown in plan view and partially in section, the vehicle is represented by a partial elevational section of one front and one rear fender;

Fig. 2 is a semidiagrammatic partial sectional view taken on line II—II in Fig. 1.

Similar parts are designated by the same numerals in the several figures of the drawing.

Referring closer to the drawing by the characters of reference in Figs. 1 and 2 the engine of the vehicle is designated by 10, a driven shaft extension thereof by 12 having fixed thereon pulley 14 that drives through belt 16 the pulley 18 which is slidingly mounted on hub 20, keyed to shaft 22 of a rotary converter 30, fastened to engine 10. Hub 20 and with it pulley 18 are held on shaft 22 by locked nut 24 and two washers 26.

As seen in Fig. 2, hub 20 has a multitude of recesses 15 accommodating balls 26, blocks 27 and springs 29. The recesses 15 become shallower in clockwise direction so that when belt 16 moves in the direction of the arrow, pulley 18 is driven clockwise, balls 26 become wedged between pulley 18 and the bottoms of recesses 15, hence, hub 29 and shaft 22 are rotated together with pulley 18 clockwise. This arrangement forms an overrunning clutch, effective in one direction and free in the opposite one. It will be understood that instead of balls 26 rollers may be used and that any type of overrunning clutch or so called free wheeling device may be employed as long as it locks in one direction and unlocks in the opposite one. For the sake of clarity the clearance between the sliding surfaces of pulley 18 and hub 20 is exaggerated in Fig. 2.

The armature 32 of the converter 30 is mounted on shaft 22 and has at one side slip rings 34 for taking the alternating current and at the other side collector 36 for delivering direct current through brushes 38 and 40. As well known in the art, rotary converters are adapted to furnish direct current in the predetermined voltage range by revolving their rotary portions either by the input of suitable alternating current (in which case they are used in the true sense of converter) or by the application of mechanical energy (in which case they serve as dynamos). I am using converter 30 in both ways.

As rotary converters are well known, its wiring and internal connections and auxiliary devices for starting and regulating, etc. are not shown in detail but only diagrammatically and outside leads are shown only so far as it is necessary to connect the converter with the rest of the combination.

Describing first the direct current output portion of the charger positive brush 40 is connected through conductor 41 with the frame or mass of the vehicle, indicated at M; the negative brush 38 is connected through conductor 44, which includes fuse 45, to the cut-out 46, one terminal of which is connected to the frame or mass at M, the other by conductor 48, including fuse 49, to clamp 53 of ammeter 54. A third terminal of cut-out 46 is connected by conductor 47 to voltage regulator 50, one clamp of which is connected to the frame or mass at M and the other by conductor 52, including fuse 51, to the field windings 42 of rotary converter 30.

The cut-out 46 and voltage regulator 50 are well known in the art; the former prevents current to flow from the battery to the commutator 36, the latter eliminates overcharging by automatically inserting a resistance thereby weakening the field when the voltage of the battery is raised nearing the end voltage of the charging. It is well known that changes in the intensity of the field of rotary converters bring about a change of the power factor of the input alternating current varying in proportion the effective electromotive force at the slip rings and with it the voltage of the generated direct current, the latter being in a definite mathematical relationship with the former.

Terminal 53 of ammeter 54 is connected by conductor 56 to overload relay 58 and conductor 59 to the lighting switches (not shown) while conductor 60, ignition switch 62 and conductor 63 lead to ignition coil 64 from which conductor 65 connects to the ignition distributor and conductor 66 to the breaker (not shown).

Terminal 55 of ammeter 54 is connected by conductor 67 to the negative clamp of battery 68 the positive clamp of which is connected to the frame or mass at M. Conductor 69 including switch 70 connects the negative clamp of the battery to starting motor 72 which is also wired to the frame or mass at M.

The above described arrangement of the charging system including the items designated by the numerals 38 to 72 is well known in the art, hence I do not describe these items nor do I show them in further detail. While I have shown an arrangement in which the negative brush 38 is connected to the negative terminal of battery 68 and the positive brush 40 and the positive terminal of the battery are grounded to the "Mass" it is obvious that the connections may be reversed the positive brush 40 connected to the positive terminal of the battery and the negative terminal thereof with brush 38 grounded.

The alternating current utilizing portion of the system comprises the rotary converter 30, its armature 32 with the slip rings 34, a transformer of which the secondary winding 74 is connected to the rotary converter 30 while its primary winding 76 is connected through fuses 78, input regulator 80, conductor 82 and switch 84 with conductors 86 branching into leads 89 and 90, respectively. In the circuit of the secondary winding 74 of the transformer a switch 85 is incorporated which is opened and closed preferably together with switch 84 so that the secondary winding forms a closed circuit when switch 84 connects conductors 82 and 86. Conductors 89 are connected to socket 96 shown to be mounted on rear fender 98 and conductors 90 are terminating in socket 92 shown to be mounted on the front fender 94 of the vehicle. Plug 99, connected by leads 100 to the outside source of alternating current, is the means by which the outside current is connected to conductors 89, 90 and the rest of the charger.

Input regulator 80 is a variable inductance shown to be inserted in the primary circuit of the transformer. It is obvious that such a regulator may be incorporated in the secondary circuit or in both circuits of the transformer.

Inasmuch as driven rotary converter 30 supplies direct current from its collector 36 and alternating current from its slip rings 34, it is obvious that the primary and the secondary alternating current circuits may be connected to conductors, sockets, and switches (not shown) for operating known electrical devices (not shown) responsive to alternating currents furnished by the rotary converter.

This embodiment of the invented charger operates as follows:

When engine 10 operates it rotates shaft 12 and pulley 14 clockwise; pulley 18, shaft 22, and armature 32 of the rotary converter are also rotated clockwise due to the locking of the overrunning clutch, formed by pulley 18, balls 26 and hub 29. The rotary converter 30 operates now as a direct current generator and charges the battery 68 and supplies also the necessary current for ignition coil 64 as well as for the lighting system. The alternating current portion will not be energized as switches 84 and 85 are open and no current will flow either in the primary nor in the secondary winding of the transformer and connected conductors 86, 89 and 90, respectively.

When the vehicle is stopped at the place where the alternating current from an outside source is available, at the customary tension of 100–125 volt, and, of the usual frequency, for which voltage and frequency the transformer and rotary converter are designed, the engine is then stopped and plug 99 of the outside source of alternating current is connected to one of the sockets 96 or 92. Then the voltage is read on voltmeter 87 and input regulator 80 is set accordingly; the presence of alternating current being also indicated by the light emitted by incandescent lamp 88. Thereupon switches 84 and 85 are closed causing the armature 32 to revolve clockwise driven by the alternating current synchronous motor which is brought up to synchronism by known starting devices (not shown) incorporated in converter 30, and delivering direct current of suitable tension through the collector 36 and brushes 38 and 40. Rotary converter 30 is wired in such a manner that armature 32 runs in the same direction on alternating current as when driven as a generator by engine 10, namely clockwise. Hub 20, balls 28, and pulley 18 forming an overrunning clutch will permit armature 32 to turn clockwise when pulley 18 and belt 16 are stopped by the engine 10 when it is not running. The speed of the rotary converter can be set to deliver direct current of desired intensity by adjusting input regulator 80 according to readings on ammeter 54. The function of input regulator 80 is essential for the proper control of the charging of battery 68.

During charging the voltage of the battery will rise and voltage regulator 50 will, in the aforementioned manner, diminish the direct current voltage generated by the converter, reducing the charging current to a trickle charge thus protecting the battery from harmful overcharging. Using the battery 68 for starting the engine 10 by closing switch 70, and energizing starter 72, the load of the battery can be lightened by employing simultaneously alternating current from an outside source, connecting it to one of the sockets 96 or 92, setting properly input regulator 80 and closing switches 84 and 85, thus supplying part of the needed direct current.

The function of input regulator 80 is automatically supplemented by voltage regulator 50 which varies the power factor and with it the effective voltage of the input alternating current at the slip rings in response to the magnitude of the electromotive force existing at the terminals of the charged battery 68.

While I have shown and described a battery charger employing an one-phase converter using one-phase alternating current, it will be obvious that converters for two or more phases may be employed for utilizing alternating currents having corresponding number of phases.

The positioning of sockets 92 and 96 in the front and rear of the vehicle, respectively, has the advantage that after starting the engine with the help of the alternating current the operator need not alight from the car to disconnect the car from the socket. He simply drives the car away and the plug, held by the attached conductor, will be pulled out from the socket, automatically.

It is evident that all switches, variable impedances and manual regulators may be located on the dash board or at other convenient places depending upon the shape and purpose of the vehicle body. The shown belt drive may be substituted by any other (gears, chain, friction drive, etc.) with the same result.

Having shown and described an illustrative embodiment of my invention it will be understood that several changes and modifications may be made by those skilled in the art without departing from the spirit and scope of my invention, hence, I do not propose to be limited by this embodiment but only by the appended claims.

What I claim is:

1. In a vehicle having an internal combustion engine and an electric storage battery, a battery charger comprising a rotary converter provided with field windings adapted to produce an electromagnetic field, said converter having a single wound armature electrically connected to slip rings for receiving alternating current and to a commutator for delivering direct current for charging said battery, drive means, actuated by said engine for turning the rotary portions of said converter relative to its stationary portions, an electric transformer having its secondary winding connected to said slip rings and its primary winding arranged in a circuit suitable to be connected to an outside source of alternating electric current, impedance varying means to regulate the tension of the input alternating current, voltage regulator means to vary the electric resistance of the circuit of said field windings and with it the intensity of said electromagnetic field in response to the terminal electromotive force of said battery to prevent harmful overcharging thereof, whereby said impedance varying means and said voltage regulator means coact to keep the voltage of the input alternating current at said slip rings and that of the generated direct current at said commutator to suitable values for proper charging of said battery.

2. In a vehicle having an internal combustion engine and an electric storage battery, a battery charger comprising a rotary converter provided with field windings adapted to produce an electromagnetic field, said converter having a single wound armature electrically connected to slip rings for receiving alternating current and to a commutator for delivering direct current for charging said battery, drive means, including an overrunning clutch, actuated by said engine for turning the rotary portions of said converter relative to its stationary portions, an electric transformer having its secondary winding connected to said slip rings and its primary winding arranged in a circuit suitable to be connected to an outside source of alternating electric current, impedance varying means to regulate the tension of the input alternating current, voltage regulator means to vary the electric resistance of the circuit of said field windings and with it the intensity of said electromagnetic field in response to the terminal electromotive force of said battery to prevent harmful overcharging thereof, whereby said impedance varying means and said voltage regulating means coact to keep the voltage of the input alternating current at said slip rings and that of the generated direct current at said commutator to suitable values for proper charging of said battery.

3. In a vehicle having an internal combustion engine and an electric storage battery, a battery charger comprising a rotary converter provided with field windings adapted to produce an electromagnetic field, said converter having a single wound armature electrically connected to slip rings for receiving alternating current and to a commutator for delivering direct current for charging said battery, drive means, including an overrunning clutch, actuated by said engine for turning the rotary portions of said converter relative to its stationary portions, an electric transformer having its secondary winding connected to said slip rings and its primary winding arranged in a circuit that includes at least one socket mounted by said vehicle for receiving conductors operatively connecting to said circuit an outside source of alternating electric current, impedance varying means to regulate the tension of the input alternating current, voltage regulator means to vary the electric resistance of the circuit of said field windings and with it the intensity of said electromagnetic field in response to the terminal electromotive force of said battery to prevent harmful overcharging thereof, whereby said impedance varying means and said voltage regulating means coact to keep the voltage of the input alternating current at said slip rings and that of the geenrated direct current at said commutator to suitable values for proper charging of said battery.

4. In a vehicle having an internal combustion engine and an electric storage battery, a battery chager comprising a rotary converter provided with field windings adapted to produce an electromagnetic field, said converted having a single wound amature eelctrically connected to slip rings for receiving alternating current and to a commutator for delivering direct current for charging said battery, drive means, including an overrunnig clutch, actuated by said engine for turning the rotary portions of said converter relative to its stationary portions, an electric transformer having its secondary winding connected to said slip rings and its primary winding arranged in a circuit that includes at least one socket mounted by said vehicle for receiving conductors operatively connecting to said circuit an outside source of alternating electric current, switch means in series with each of said primary and secondary windings for opening and closing, respectively, their electric circuits, impedance varying means to regulate the tension of the input alternating current, voltage regulating means to vary the electric resistance of the circuit of said field windings and with it the intensity of said electromagnetic field in response to the terminal electromotive force of said battery to prevent harmful overcharging thereof, whereby said impedance varying means and said voltage regulating means coact to keep the voltage of the input alternating current at said slip rings and that of the generated direct current at said commutator to suitable values for proper charging of said battery.

5. An electric storage battery charger according to claim 4 in which said switch means are adapted to be operated simultaneously in the primary and secondary circuits of said transformer.

ALBERT BERNHARD DE SALARDI.

REFERENCES CITED

The following references are of record in the file of this patent:

UNITED STATES PATENTS

| Number | Name | Date |
|---|---|---|
| 1,439,483 | Ritter | Dec. 19, 1922 |
| 1,921,719 | Allen | Aug. 8, 1933 |
| 1,954,931 | Hambuechen | Apr. 17, 1934 |
| 1,957,016 | Loudon | May 1, 1934 |
| 1,962,992 | Leece et al. | June 12, 1934 |
| 1,981,738 | McNeil | Nov. 20, 1934 |
| 1,993,914 | Bohm | Mar. 12, 1935 |
| 2,137,894 | Elder | Nov. 22, 1938 |
| 2,227,118 | Amsden | Dec. 31, 1940 |
| 2,369,826 | Heyer et al. | Feb. 20, 1945 |
| 2,383,722 | Haug | Aug. 28, 1945 |

OTHER REFERENCES

"Popular Mechanics," June, 1915, page 831.
Westric, "Electrical Review," October 25, 1946.